United States Patent [19]

Shaw et al.

[11] 3,881,629
[45] May 6, 1975

[54] SELF-ALIGNING RUPTURE DISC

[75] Inventors: Kenneth R. Shaw, Kansas City;
Franlkin A. Hansen, Raytown, both of Mo.

[73] Assignee: Continental Disc Corporation, Riverside, Mo.

[22] Filed: Sept. 4, 1973

[21] Appl. No.: 393,736

[52] U.S. Cl. ............................. 220/89 A; 137/68
[51] Int. Cl. .................................... B65d 25/00
[58] Field of Search............ 220/89 A, 89 R; 137/68

[56] References Cited
UNITED STATES PATENTS

| | | | |
|---|---|---|---|
| 2,875,921 | 3/1959 | Coffman | 220/89 A |
| 2,947,443 | 8/1960 | Sawyer et al. | 220/89 A |
| 2,954,897 | 10/1960 | Hansen et al. | 220/89 A |
| 3,169,658 | 2/1965 | Porter | 220/89 A |
| 3,445,032 | 5/1969 | Raidl, Jr. et al. | 220/89 A |

*Primary Examiner*—William I. Price
*Assistant Examiner*—Joseph M. Moy
*Attorney, Agent, or Firm*—Fishburn, Gold & Litman

[57] ABSTRACT

A safety pressure relief device of the rupturable disc type is associated, in a unitary assembly, with a vacuum support disc retained in a mounting ring having an outer flange portion secured to the rupture disc and an inner sleeve portion extending axially of the flange portion and away from the rupture disc. A ledge projects inwardly from the sleeve portion forming therewith a depressed seat for receiving the support disc. The exterior of the sleeve is received into the mounting flange or inlet holder, providing alignment therein for the assembly.

9 Claims, 4 Drawing Figures

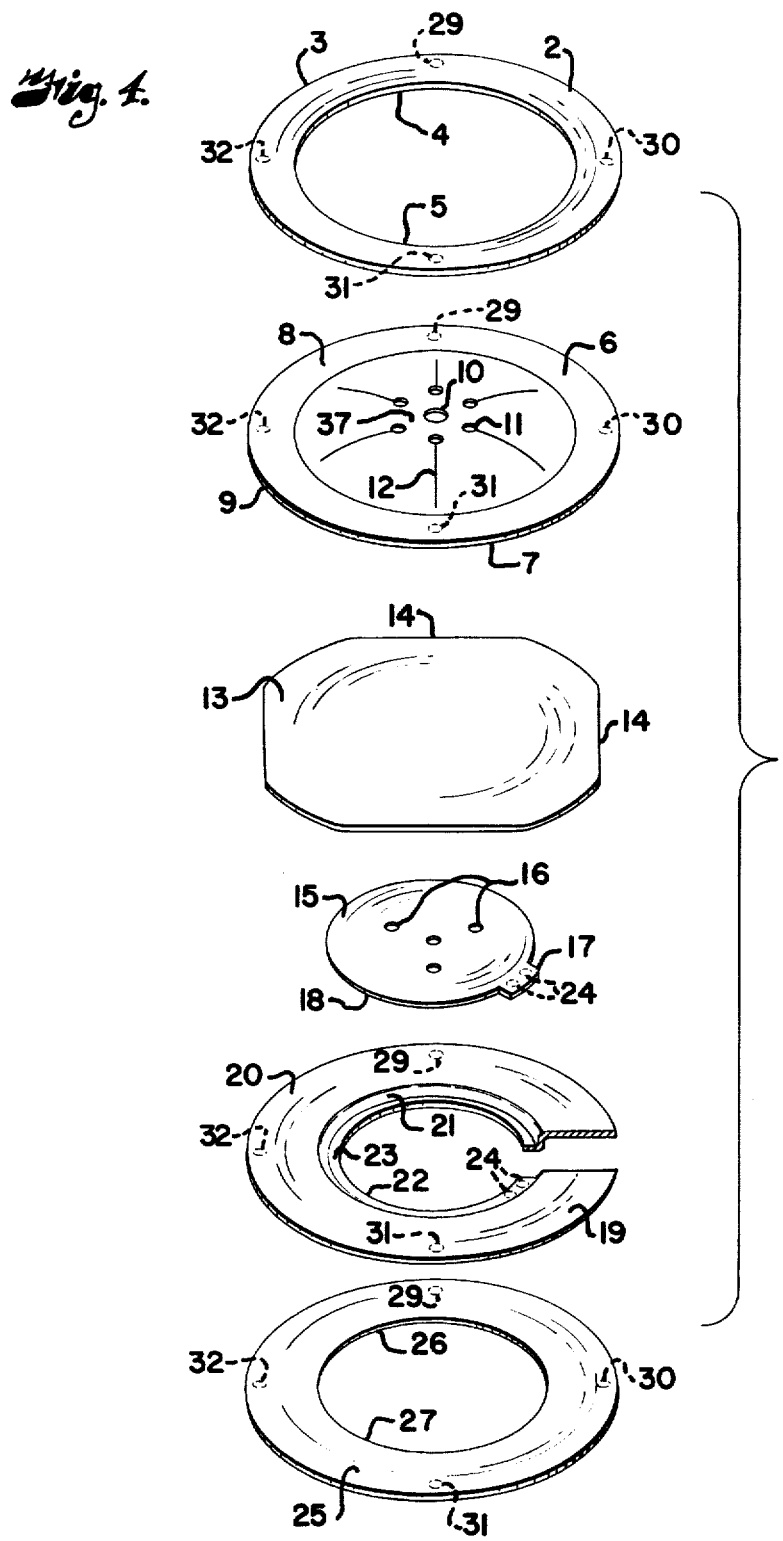

SELF-ALIGNING RUPTURE DISC

This invention relates generally to the field of safety pressure relief devices of the rupturable disc type and more particularly to a unitary assembly of rupturable disc and vacuum support which is self-aligning in the holding flange.

Heretofore, preassembled safety pressure relief devices consisting of a perforated rupture disc, sealing element and vacuum support have been suggested, for example, note U.S. Pat. No. 2,954,897. Such devices, however, when centering elements were provided, utilized a tapered surface projecting toward the outlet passageway and tended to contact and interfere with the operation of the rupture disc. This invention avoids the use of centering elements associated with the disc, rather, utilizing a centering sleeve extending toward the inlet passageway and having the additional function of seating the vacuum support.

The principle objects of the present invention are: to provide a unitary, self-centering pressure relief device which utilizes a sleeve extending toward the inlet passageway for centering; to provide such a device wherein the sleeve also forms a seat for the vacuum support; to provide such an arrangement wherein the vacuum support is depressed from the plane of the seal; to provide such a relief disc assembly which is easily modified during production to vary rupture pressure; to provide such a device which is relatively thin in total cross-sectional thickness and yet is self-centering; and to provide such assembly which is simple and relatively inexpensive in construction and highly reliable in use.

Other objects and advantages of this invention will become apparent from the following description taken in connection with the accompanying drawings wherein are set forth by way of illustration and example, certain embodiments of this invention.

FIG. 4 is an exploded perspective view showing various elements of the assembly.

Figure 1:
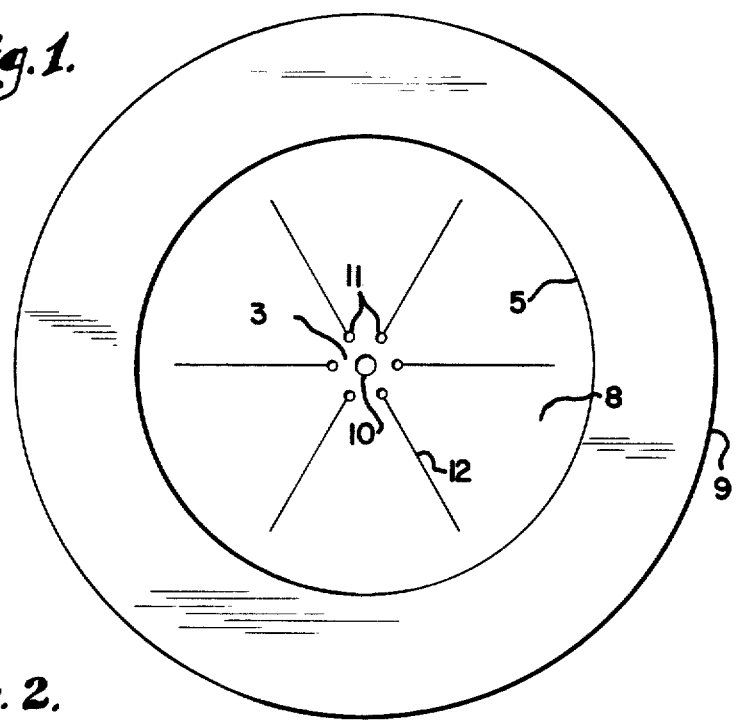
FIG. 1 is a plan view of the self-aligning rupture disc assembly.

Referring to the drawings in more detail:

The reference numeral 1 generally indicates a self-aligning rupture disc assembly embodying this invention. Referring particularly to FIG. 4, the assembly 1 comprises a flat outlet mounting ring 2, of a suitable relatively rigid metal such as stainless steel, having an exterior circular periphery 3 and an internal circular edge 4, the latter defining an internal diametral opening 5.

A pressure relief disc 6 has a lower or inlet surface 7, an upper or outlet surface 8 and a circular periphery 9 similar in diameter to that of the mounting ring 2. The disc 6 is secured, as described further below, to the outlet mounting ring 2 against the surface 8. The disc, further, in this example, bulges upwardly through the outlet mounting ring opening 5 forming a dome and has a central opening 10 surrounded by a plurality of openings 11 which are circumferentially spaced thereabout in the central part of the dome. Slits 12 communicate respectively into and extend radially outwardly from each of the openings 11 and terminate on a diameter less than that of a mounting ring diametral opening 5, FIG. 1, the length of the slits partially determining the rupture pressure of the disc.

A resilient sealing member 13 is positioned adjacent the relief disc inlet surface 7 and has selected peripheral cutouts or removed portions 14 which are positioned apart a distance less than the diameter of the disc 6. The sealing member 13 is preferably constructed of a thin, relatively inert material such as Teflon which will function to prevent leakage through the assembly, but not add appreciably to the pressure required to rupture the disc 6.

A vacuum support disc 15 has a diameter less than the outlet mounting ring diametral opening 5 and includes, in this example, a plurality of spaced openings 16 therethrough to permit direct fluid communication between the pressure vessel (not shown) on the inlet side of the disc assembly and the sealing member 13. An integral tab 17 in this embodiment projects radially from the periphery 18 of the support disc and acts as a mounting hinge, as described below.

Figure 2:
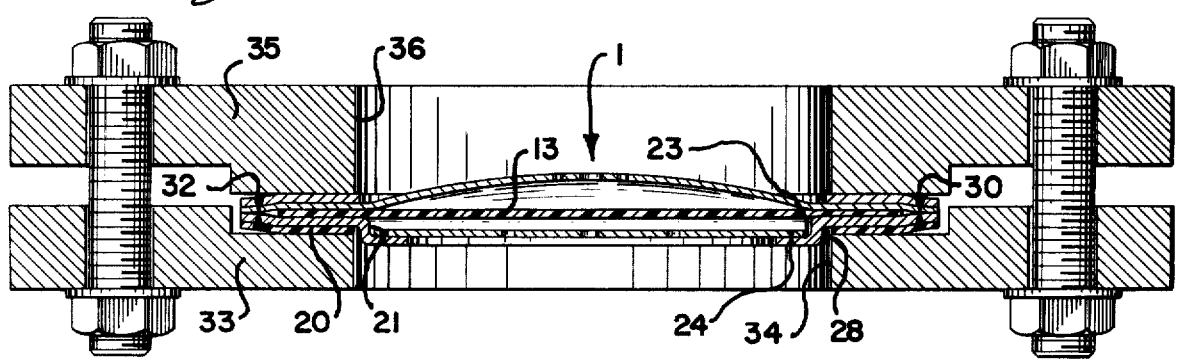
FIG. 2 is a cross-sectional view showing the assembly secured between typical holders or mounting flanges.
Figure 3:
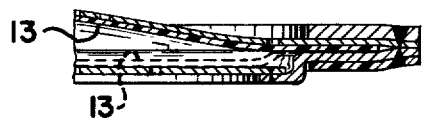
FIG. 3 is a fragmentary cross-sectional view of the assembly showing the seal urged against the rupture disc.

A support disc mounting ring 19 includes a flat flange portion 20 having a diameter similar to that of the disc 6 and is located adjacent the sealing member 13. The ring 19 has an inner sleeve portion 21 extending axially of the flange portion 20 and away from the sealing member 13 as best seen in FIG. 2. A circular ledge 22 projects inwardly from the outer terminus of the sleeve portion 21 forming therewith a depressed internal seal 23 receiving the support disc 15. The tab 17 is secured to the ledge 22, in this example, by means of spot welds 24, these being, in this example, the only connection between the mounting ring 19 and the support disc 15 whereby the disc 15 may freely hinge upwardly by bending the tab 17.

An inlet mounting ring 25 has an internal circular edge 26 forming a diametral opening 27 through which the sleeve portion 21, and consequently the seat 23, is received. The sleeve portion 21 projects beyond the inlet mounting ring 25 thus exposing an external cylindrical centering surface 28.

The respective mounting rings 2 and 25, the pressure relief disc 6 and the mounting ring 19 are respectively secured together, in this example, by means of suitable spot welds 29–32 which are circumferentially spaced apart near the respective outer peripheries of the members. The spot welds 29–32 join the respective peripheries together in areas where the disc 6 and mounting ring flange portion 20 are exposed to each other due to the cut-out or removed portions 14 of the sealing member 13. The sealing member 13 is thereby trapped in aligned position in the assembly even though there is no fixed connection with adjacent elements. The overall thickness of the assembly is relatively thin because of the double use of the sleeve portion 21, that is, for both assembly alignment and vacuum support disc retention.

In use, the assembly 1 is placed into the inlet flange or holder 33 forming part of the usual device for clamping the rupture disc assembly into operative position. The sleeve portion 21 projects into the inlet passageway 34 whereupon the sleeve centering surface 28 cooperates with the interior surface thereof to insure proper alignment of the assembly in the passageway. The outlet flange or holder 35 is then assembled with the inlet flange to produce a clamp and seal with the assembly 1 therebetween.

During periods when there is no differential pressure on the sealing member 13, it maintains a generally flat configuration as best illustrated in FIG. 2. During periods when the pressure vessel (not shown) is under vacuum, the sealing member 13 is drawn against the support disc 15 which has ample strength to support same against a full atmosphere. Pressure in the vessel greater than that in the outlet passageway 36, however, causes the sealing member 13 to bulge against the inlet surface 7 of the disc 6. When rupture pressure is reached, the disc material 37 between the center opening 10 and the circumferential openings 11 will tear, releasing the restraint on the sealing member 13. The sealing member 13 will then rupture and the subsequent rush of fluid through the outlet passageway 36 will force the support disc 15 upwardly through the diametral opening 5 along with pie-shaped sections of the disc 6, producing a wide, generally unobstructed relief passageway for rapid lowering of pressure in the vessel under protection.

It is to be understood that although certain embodiments of this invention have been illustrated and described, it is not to be limited thereto except insofar as such limitations are included in the following claims.

What we claim and desire to secure by Letters Patent is:

1. In a self-aligning rupture disc assembly adapted to block a flow passageway and having an inlet flange having an inlet passageway, an outlet flange, a pressure relief disc having an inlet surface and an outlet surface, said relief disc being sealed at said outlet surface with respect to said outlet flange, and a perforated vacuum support disc, the improvement comprising:
   a. A support disc mounting ring having an outer flange portion sealed with respect to said relief disc inlet surface and an inner centering sleeve portion extending axially of said flange portion and away from said relief disc,
   b. said sleeve portion being of lesser outside diameter than said inlet passageway and received thereinto, and
   c. a ledge projecting inwardly from said sleeve portion forming therewith a depressed seat receiving said vacuum support disc.

2. A self-aligning rupture disc assembly adapted to block a flow passageway, comprising:
   a. an outlet mounting ring having an internal diametral opening, an inlet flange having an inlet passageway and an outlet flange,
   b. a perforated pressure relief disc having an inlet surface and an outlet surface, said relief disc being secured to said outlet mounting ring against said outlet surface,
   c. a sealing means positioned adjacent said relief disc inlet surface to seal said flow passageway,
   d. a perforated vacuum support disc having a diameter less than said outlet mounting ring diametral opening,
   e. a support disc mounting ring adjacent said sealing member and having an outer flange portion and an inner centering sleeve portion extending axially of said flange portion and away from said sealing member, said sleeve portion being of lesser outside diameter than said inlet passageway and received thereinto, and
   f. a ledge projecting inwardly from said sleeve portion forming therewith a depressed seat receiving said vacuum support disc.

3. The assembly as set forth in claim 1 wherein:
   a. said vacuum support disc includes a tab projecting therefrom,
   b. said tab being secured to said ledge.

4. The assembly as set forth in claim 2 wherein:
   a. said vacuum support disc has a tab projecting from the periphery thereof and secured to said ledge.

5. The assembly as set forth in claim 2 including:
   a. an inlet mounting ring having an internal diametral opening receiving said sleeve portion therethrough.

6. The assembly as set forth in claim 5 wherein:
   a. said support disc mounting ring and inlet mounting ring are secured together by spot welds positioned near the respective outer peripheries thereof.

7. The assembly as set forth in claim 2 wherein:
   a. said outlet mounting ring and pressure relief disc and support disc mounting ring are secured together by spot welds positioned near the respective peripheries thereof.

8. The disc assembly as set forth in claim 7 wherein:
   a. said sealing member is retained in aligned position adjacent said relief disc inlet surface by said spot welds.

9. The disc assembly as set forth in claim 2 wherein:
   a. said pressure relief disc has a central opening and a plurality of circular openings circumferentially spaced about said central opening, and
   b. a slit communicating into and extending outwardly from each of said circular openings and terminating on a diameter less than that of said outlet mounting ring diametral opening.

* * * * *